(12) United States Patent
McGehee et al.

(10) Patent No.: US 10,858,597 B2
(45) Date of Patent: Dec. 8, 2020

(54) CONTACTOR AND SEPARATION APPARATUS AND PROCESS OF USING SAME

(71) Applicant: MERICHEM COMPANY, Houston, TX (US)

(72) Inventors: James F. McGehee, Houston, TX (US); Jeffrey B. Gomach, League City, TX (US); Baisheng Zou, Pearland, TX (US)

(73) Assignee: MERICHEM COMPANY, Houston, TX (US)

( * ) Notice: Subject to any disclaimer, the term of this patent is extended or adjusted under 35 U.S.C. 154(b) by 0 days.

(21) Appl. No.: 16/825,202

(22) Filed: Mar. 20, 2020

(65) Prior Publication Data

US 2020/0216761 A1    Jul. 9, 2020

Related U.S. Application Data

(62) Division of application No. 15/869,271, filed on Jan. 12, 2018, now Pat. No. 10,633,599.

(51) Int. Cl.

| | | |
|---|---|---|
| *C10G 21/06* | (2006.01) | |
| *B01D 11/04* | (2006.01) | |
| *B01D 17/04* | (2006.01) | |
| *B01D 17/12* | (2006.01) | |

(Continued)

(52) U.S. Cl.
CPC .......... *C10G 21/06* (2013.01); *B01D 11/0449* (2013.01); *B01D 17/0214* (2013.01); *B01D 17/045* (2013.01); *B01D 17/12* (2013.01); *B01D 11/0492* (2013.01); *B01D 2011/005* (2013.01);

(Continued)

(58) Field of Classification Search
CPC .............. C10G 21/06; C10G 2300/207; C10G 2300/202; B01D 17/045; B01D 17/12; B01D 17/0214; B01D 11/0449; B01D 11/0492; B01D 2011/005
See application file for complete search history.

(56) References Cited

U.S. PATENT DOCUMENTS

| | | |
|---|---|---|
| 3,758,404 A | 9/1973 | Clonts |
| 3,977,829 A | 8/1976 | Clonts |
| 3,992,156 A | 11/1976 | Clonts |

(Continued)

*Primary Examiner* — Prem C Singh
*Assistant Examiner* — Juan C Valencia
(74) *Attorney, Agent, or Firm* — McDonnell Boehnen Hulbert & Berghoff LLP (57) ABSTRACT

An improved contactor/separator process is presented where one or more stages of contact and separation is achieved by providing one or more shroud and disengagement device combinations within a vessel, where the disengagement device is connected to the top of the shroud that contains vertically hanging fibers. A liquid admixture of immiscible fluids is directed co-currently upward through the shroud at flooding velocity or greater, where all of the admixture exits the disengagement device through a coalescing material. Tray supports are used to stack additional shroud and disengagement combinations vertically within the vessel. Each tray allows less dense liquids exiting one disengagement device from a lower shroud and disengagement device combination to enter the bottom of a shroud of a shroud and disengagement device combination position vertically above the lower shroud and disengagement device combination.

5 Claims, 3 Drawing Sheets

(51) Int. Cl.
*B01D 17/02* (2006.01)
*B01D 11/00* (2006.01)
(52) U.S. Cl.
CPC . *C10G 2300/202* (2013.01); *C10G 2300/207* (2013.01)

(56) References Cited

U.S. PATENT DOCUMENTS

| | | |
|---|---|---|
| 8,900,446 B2 | 12/2014 | Zhang et al. |
| 2014/0014593 A1* | 1/2014 | McGehee .......... B01D 17/0208 210/763 |
| 2014/0076805 A1 | 3/2014 | Massingill |

* cited by examiner

CONTACTOR AND SEPARATION APPARATUS AND PROCESS OF USING SAME

CROSS REFERENCE TO RELATED APPLICATIONS

The present application is a divisional of U.S. patent application Ser. No. 15/869,271 filed Jan. 12, 2018, which is herewith incorporated by reference into the present application.

FIELD OF INVENTION

The invention relates to a co-current up flow process and apparatus for contacting and separating a mixture of at least two liquids having different densities in a non-dispersive process utilizing a plurality of vertically hanging fibers contained in a shroud and disengagement device, where the disengagement device is connected to the top of the shroud. The process allows a hydrocarbon feed to be treated with an aqueous solution to remove acidic impurities, such as mercaptans, hydrogen sulfide, carbon dioxide, sulfur dioxide, and carbonyl sulfide.

BACKGROUND

In hydrocarbon treatment processes, it is often necessary at some point in the process to contact and then separate two or more liquids from each other based on density differences. One approach is to use Merichem Company's FIBER FILM® contactor technology in combination with a horizontal settling vessel. These fiber-film type separators/contactors are described in U.S. Pat. Nos. 3,758,404; 3,977,829 and 3,992,156, all of which are incorporated herein by reference. The basic design of a fiber-film type contactor/separator comprises a plurality of vertical hanging fibers contained either totally or partially within a vertical shroud. This shroud is configured to maintain the liquids introduced at the top of the shroud within the inside of the shroud and in contact with the hanging fibers as the liquids flow downward. i.e., downward flow that is parallel to the vertical axis of the fibers and shroud. Once the liquids exit the shroud they enter a separation section that is located below the shroud, typically a horizontal settler, where gravity separates the phases, with the lower density liquids forming an upper layer and the higher density liquids forming a lower layer. Each layer can then be selectively removed from the separation section of the apparatus.

Using the above-described known contacting scheme, refiners have treated low density liquid hydrocarbon feeds with higher density aqueous treating liquids, where both liquids are introduced at the top of the hanging fibers as an admixture such that gravity pulls the liquid admixture vertically down the hanging fibers that are contained within the shroud. Although such contacting schemes have found some amount of success, there is room for improvement, specifically with regard to flexible process configuration that lead to cost savings in new plant construction and old equipment modification. The present invention provides such an improvement over traditional standalone down flow contactors that require more piping, level control instruments, control valves, and more plot space to achieve the same functionality, especially in two-stage configurations. These and other improvements of the present invention will become evident from the following description and accompanying drawings

SUMMARY

Our invention is directed to an improved apparatus and process for contacting at least two immiscible liquids, where a low density feed liquid is contacted with a higher density treating solution so as to extract and remove contaminants from the low density liquid. This contacting occurs as both liquids are flowing co-currently and upward within a vertical shroud containing a plurality of vertically hanging fibers. Contact of the two fluids as an admixture with the fibers within the shroud allows for the mass transfer of contaminants from the lower density liquid into the higher density treating solution. The flow rate of the admixture is preferably at or greater than the flooding velocity, which is defined as the minimal velocity at which both the organic phase and the aqueous phase flow upward. Ultimately, the admixture reaches the top of the shroud and exits into a disengagement device that contains a coalescing material that is designed to break any dispersion or emulsion of the two liquids. All the liquids entering the disengagement device exit the disengagement device following a radial flow path that is angled with respect to the vertical axis of the vessel holding the shroud and disengagement device combination. The exiting liquids enter a gravity settling zone that surrounds the outside of the shroud that allows separation of the two liquids.

In a preferred configuration, our invention includes a vessel, either new or existing vessel, having an interior volume that contains a shroud positioned within the interior volume and preferably supported on a tray configured to direct liquid flow upward inside the shroud. Preferably, the vessel is a vertical vessel, meaning that the height of the vessel is greater than the diameter of the vessel. Most preferably, the vessel has the same or nearly the same diameter at the top as it does at the bottom. In other words, there is no abrupt transition from an upper vertically oriented circular section to a lower circular horizontal section. In situations where an existing apparatus is to be retrofitted according to our invention, the vessel could have varying length/diameter ratios and would likely have a number of internal contacting stages, such as sieve trays, valve trays, or sections of structured packing.

In another possible embodiment of our invention, there is a shroud positioned within the vessel that has attached to a top portion, i.e., a portion that is furthest from ground level, a disengagement device, that operates as a coalescer and that allows the liquids flowing co-currently up flow through the shroud to flow radially out of the disengagement device following a flow path that is tangential to the vertical axis of the vessel. As the liquids follow this tangential flow path all the liquids necessarily contact the coalescing material associated with the disengagement device. The top of the disengagement device is designed and configured as a cap or cover that causes all of the liquid flowing up flow into the disengagement device from the shroud to following the tangential flow path through the coalescing material. On the inside of the top cover of the disengagement device a wire or rod network holds the fibers in place and allows the fiber to be installed or removed from the shroud.

At the bottom, open end of the shroud there may be another support structure than can attach to the fibers so that the fibers are maintained in a vertically hanging orientation within the shroud during the co-current up flow of the liquids through the shroud. Preferably, a liquid distributor is located within or adjacent to the bottom open end of the shroud. The bottom of the shroud can also be positioned over a tray that directs liquids up into the shroud. The tray can also act as a structural support for the shroud.

Within the shroud hangs one or more bundles of long ribbons or fibers that define a vertical axis that is parallel to the vertical axis of the vessel. These fibers are configured to maximize contact of liquids that are typically immiscible and consist of a higher density liquid and a lower density liquid. An example of such liquids would include a liquid hydrocarbon and an aqueous treatment solution. The hanging fibers are positioned vertically within the shroud and within the disengagement device roughly perpendicular to ground level. The fibers within the shroud can be a separate independent bundle or an extension of the fiber bundle that is contained within the disengagement device. Preferably, the fibers comprise long thin filaments or ribbons made of materials selected from a group consisting of, but not limited to, metal fibers, glass fibers, polymer fibers, graphite fibers and carbon fibers that meet two criteria: (1) the fiber material must be preferentially wetted by the admixture of at least two immiscible liquids; and (2) the fibers must be of a material that will not contaminate the process or be destroyed by it, such as by corrosion.

In yet another embodiment of our invention the process can include an apparatus for contacting at least two immiscible liquids where the apparatus includes a vertical column having an interior space and a vertical axis. A shroud is positioned vertically within the interior space parallel to the vertical axis, where the shroud comprises length defined by a solid, non-porous wall extending from a bottom end to a top end. A bundle of fibers hangs vertically within the shroud parallel to the vertical axis, where the non-porous wall contains and forces liquids introduced into the shroud to flow vertically upward to contact the fibers. A feed inlet is positioned adjacent to or within the bottom end of the shroud, which is preferably an open end.

A coalescer, as part of a disengagement device, is connected to, or an integral part of, the top end of the shroud, where the coalescer is affixed to a porous support surrounding the fibers and extending vertically from the top end of the shroud terminating at a closed cover or cap that does not allow the liquids flowing upwards within the disengagement device to exit the top of the disengagement device. The closed cover instead forces all the liquids to exit through the coalescing material that essentially forms a wall or conduit as part of the disengagement device. The radial flow path of the liquids flowing through the coalescing material is not parallel to the vertical axis of the vessel. The apparatus also includes a gravity settling zone located at a bottom section of the interior space of vessel and above the bottom of vessel or above at a tray that connects to the bottom end of the shroud. The setting zone is an annular space around the outside of the shroud. The denser liquid that settles out in a lower layer of the settling zone is not in liquid communication with the liquid admixture liquid flowing upward within the shroud.

The porous support of the disengagement device allows liquid to contact a coalescing material that may be inserted within a supporting envelope having one or more openings. This supporting envelope can be in the form of an annulus having inner and outer walls each having one or more openings and where the coalescing material is positioned between the inner and outer walls adjacent to the one or more openings. Preferably, the coalescing material is selected from the group consisting of wire grid, porous metal wall, open-celled sponge, woven wire screen, knitted wire mesh, woven or non-woven fibrous material of metal, polymer resins or combinations of metal and polymer. Most preferably, the coalescing material has an installed density of from about 15 to about 30 lb./ft' and a volumetric void fraction of from about 90% to about 99%. The one or more openings of the support can also represent at least a 50% open area of the coalescer.

The liquids fed to the apparatus of our invention can be as separate streams or as an admixture of a lower density liquid containing contaminants and a higher density treating liquid. The liquids flow upward and parallel to the vertical axis within the shroud. The walls of the shroud are impermeable and can be a tube-like pipe or conduit like structure having round, oval, square, rectangular or another shape that ensures contact of the hanging fibers with the admixture of liquids flowing upwards. The actual cross-sectional shape of the shroud is not important to the invention and the shroud can vary in diameter or shape across the vertical length of the shroud. Because the shroud has no openings in the wall, the admixture of liquids must flow upward toward the top of the vessel and parallel to the vertical axis. This contained flow of the admixture within the shroud ensures that the admixture of liquids is forced to continue flowing in an upward direction parallel to the vertical axis while contacting the bundle of hanging fibers where mass transfer can occur such that the contaminants from the lower density feed liquid are transferred to the higher density treating liquid.

Once the admixture of liquids has reached the disengagement device at the top of the shroud, the admixture of liquids can only exit the disengagement device following a radial flow path that is not parallel to the vertical axis defined by the hanging fibers. As the admixture of liquids exits the disengagement device in a radial flow path, the admixture can encounter a top plate or wall on the disengagement device that tends to force the exiting admixture to flow downward in the annular area between the shroud and the vessel wall. Additionally, as the admixture exits the disengagement device the immiscible liquids in the admixture coalesce into separate liquid phases. Depending on the properties of the coalesced liquid, droplets, rivulets or small steams of the higher density liquid are formed that fall downward on the outside of the disengagement device and the outside of the shroud in parallel to the vertical axis. The coalesced higher density liquid will flow downward through the annular area between the shroud and the vessel wall and will settle into a lower phase layer at the bottom of the vessel interior. This lower phase layer is not in fluid communication with the admixture entering the bottom of the shroud as it is sealed off by a connection with the bottom of the vessel or a tray. The less dense liquid in the admixture of liquids exiting the disengagement device forms the upper phase layer within the interior of the vessel that defines the gravity settling zone occupying the interior volume between the outside wall of the shroud and the inside wall of the vessel. Within the gravity settling zone the liquids undergo further separation of the higher density liquid from the lower density liquid with the lower phase layer comprising the higher density liquid and the upper phase layer comprising the lower density liquid. A liquid interface is established where the two layers join. Preferably, the liquid interface is located at a point closer to the bottom of the shroud than to the top of the shroud. The gravity settling zone is designed to allow a sufficient residence time to provide additional separation time and efficiency.

The disengagement device can be a separate structure connected to the shroud or it can be fabricated as a unified part of the upper portion of the shroud so that the disengagement device is integral with the shroud. Regardless of the specific construction, the disengagement device must allow all of the admixture of liquids to exit radially through one or more openings in a tangential flow path, i.e., one that is not parallel to the vertical axis of the vessel. A preferred disengagement device comprises a vertical segment connected to the top of the shroud either on the inside of the shroud or, more preferably, on the outside of the shroud. The disengagement device should have one or more side openings or holes that allow radial flow of a portion of the admixture of liquids. In some case the side openings are formed as a perforated extension of the shroud. Preferably, this perforated extension can be wrapped with a wire screen or other cage-like support structure that holds the coalescing material, which is positioned to contact the admixture of liquids that exits radially from the disengagement device following a flow path that is roughly perpendicular or at approximately a right angle relative to the vertical axis. The wrapped coalescing material can be held in place by bands, ties, clamps or other fasteners attached to the external surface of the disengagement device provided that the exiting admixture of liquids is forced to contact the coalescing material.

The coalescing material is selected from the group consisting of wire grid, porous metal wall, open-celled sponge, woven wire screen, knitted wire mesh, woven or non-woven fibrous material of metal, polymer resins or combinations of metal and polymer resins, multiple co-woven filaments, packing, fiber filters, and combinations of media layer on each other. The coalescing material can be fabricated from stainless steels, Duplex stainless steels, alloys, plastics, fluoropolymers, fibrous components (polyolefin, polyesters, fluoroglass fibers, and like materials), and mixtures of same. The coalescing material is most advantageously positioned and/or supported as part of the disengagement device to interact with the admixture of liquids to cause formation of small droplets. These droplets then grow to larger droplets that eventually enter the gravity settling zone whereby the heavier phase or more dense liquid forms a lower phase that settles out and separates from the lighter, less dense liquid by gravity.

Wire mesh coalescing material can comprise a combination of wires and fibers to create a maximum surface area for droplets to coalesce. In many cases the wire and fiber are from a different construction material, where one is hydrophilic (e.g. metal) and the other is hydrophobic (for example, polyolefin or fluoropolymer) which enhances the separation. Examples of such a "co-woven" materials are sold by AMACS Process Tower Internals of Alvin, Tex. There is an increased coalescence effect at the junction point between both materials. Therefore, using both the metal and polymeric materials will increase coalescing efficiency significantly.

Most preferably, the coalescing material is incorporated into an annular supporting envelope or ring that forms part of the vertical length of the disengagement device. Alternatively, the coalescing material itself may be formed into an annulus that that is affixed to the disengagement device. Where the coalescing material is incorporated into an annular supporting envelope, the inner ring or wall of the supporting envelope contains a plurality of holes that allow the admixture of liquids to pass into the inside of annulus where the admixture contacts the coalescing material that is positioned within or otherwise packed into the annulus. This inner wall could be the perforated extension of the shroud as mentioned above. The outer ring or wall of the annulus likewise has a plurality of holes, slots, perforations, screen or grid openings or other such openings to allow the admixture to pass to the outside of the disengagement device. The type of openings used in the outer wall may or may not be the same as that used on the inner wall. Regardless of whether the coalescing material is located in a supporting envelope having two walls with perforations, or is itself formed into an annulus without supporting walls, or is just wrapped around a single wall that is perforated, the volumetric void fraction of the coalescing material is preferably in the range of from about 90% to about 99%, more preferably from about 95% to 98%. The coalescing material should preferably occupy a volume that is sufficient to eliminate dispersion and form a coalesced liquid as either droplets or a continuous liquid stream. The amount of coalescing material needed can be varied to increase or decrease the holdup or residence time necessary to form the coalesced liquid. A preferred coalescing material is a co-woven type material comprised of 316 stainless steel and polytetrafluoroethylene (Teflon) fiber filaments, with very fine fiber size and having an installed density of around 15 to 30 $lb/ft^3$.

The apparatus of our invention finds utility in a mass transfer and separation process wherein at least two immiscible liquids, such as, but not limited to, an admixture of an aqueous treatment solution and one or more hydrocarbons contaminated with sulfur compounds, are contacted in order to extract the sulfur contaminants. After the transfer of the sulfur contaminants into the aqueous treating solution, the two immiscible liquids are separated and removed from the gravity settling zone. In another aspect, the invention is directed to an improved liquid hydrocarbon treatment process where sulfur contaminants are extracted from a hydrocarbon using an aqueous treating solution containing a liquid catalyst. The aqueous treating solution containing the extracted sulfur compounds can be subsequently directed to another process to catalytically convert the extracted sulfur contaminants, i.e., convert mercaptans to disulfide oils (DSO) in an oxidation reaction. Our invention can be used in treating any hydrocarbon, including crude oil, LPG, kerosene, naphtha, natural gas condensate, gasoline or other fuels, where the interfacial tension between the hydrocarbon commodity and the treating solution is less than 10 dynes/cm and more particularly less than 5 dynes/cm and where the phases tend to remain as a dispersion which cannot be immediately resolved and accumulates in the vessel. The invention achieves separation residence times many times shorter than in conventional gravity settlers.

As used herein, disulfide oil or DSO is meant to include a mixture of possible disulfides, including dimethyl disulfide, diethyl disulfide, methyl ethyl disulfide and higher disulfides. Likewise, the term mercaptan is meant to include any of a class of thiols that are similar to the alcohol and phenol, but containing a sulfur atom in place of the oxygen atom. Compounds containing —SH as the principal group directly attached to carbon are named 'thiols'.

In yet another aspect of our invention the separation process and apparatus described above finds utility in a process comprising a method for treating a sour hydrocarbon containing mercaptans where the liquid hydrocarbons containing mercaptans are mixed with an aqueous treatment solution comprising water, alkali metal hydroxide, a polyvalent chelated metal catalyst, and at least one alcohol, preferably having atmospheric boiling points of 65° C. to 225° C. The admixture of liquids is then directed up flow into and through the shroud as a co-current admixture. Mass transfer of the mercaptans occurs as the admixture of liquids contacts the vertical hanging fibers contained within the shroud to form a product admixture of immiscible liquids that is directed upward within the shroud, where the admixture exits the shroud and enters the disengagement device. Ultimately the admixture travels upward within the disengagement device where the top cap or cover causes the liquids to exit the disengagement device in a radial flow path relative to the vertical axis. The exiting liquids enter a gravity settling zone in a bottom section of the interior space of vertical column surrounding the outside of the shroud. The outside of the shroud is sealed with a tray or the bottom of the vessel to prevent liquid settling in the lower phase of the settling zone from entering the inside of the shroud.

A hydrocarbon stream reduced in sulfur contaminants forms a top phase layer in the settling zone, which can be removed from the process through a first outlet at the top of the vessel. The aqueous treatment solution containing the extracted mercaptans is referred to as spent solution and forms as a lower layer and is removed from the process through a second outlet located in the bottom portion of the vessel. This spent treatment solution can be partially recirculated to mix with the contaminated hydrocarbon feed to the process and the remainder can be regenerated in a separate process. The regenerated treatment solution can be mixed with fresh make-up solution and then returned to mix with the contaminated hydrocarbon feed. In the situations where the aqueous treatment solution contains a catalyst component, then the spent treatment solution can be further processed in the presence of oxygen to oxidize the mercaptans to DSO that can then be separated from the treatment solution.

In another embodiment, our invention can be used as a multiple stage method for treating an admixture of immiscible liquids, where two or more shroud and disengagement device combinations are supported the within the same vertical column and are positioned in a vertically stacked configuration one above the other. Each shroud and disengagement combination would contain a bundle of fibers as discussed above and would be connected to and supported by a tray mounted to the interior walls of the vessel. The tray contains a center pipe or passage which directs the lower density treated liquid from the upper phase layer of the gravity settling zone of the lower section into the entrance of the fiber bundle in the upper section. The aqueous treatment solution mixed with the lower density treated liquid in the second stage can comprise a recycled portion of the lower phase of the gravity settling zone of the second stage as well as fresh or make-up aqueous treatment solution.

In a two-stage process a liquid feed of hydrocarbons contaminated with sulfur compounds is fed to the open end of a first shroud and disengagement device combination along with an aqueous treatment solution that comprises only water and alkali metal hydroxide, i.e., a caustic solution or such a caustic solution that also includes a catalyst, such as a chelated polyvalent metal catalyst, or at least one alcohol, preferably having atmospheric boiling points of 65° C. to 225° C. The hydrocarbon and aqueous liquids form an admixture that flows upward through the first shroud and disengagement combination positioned in the lower portion of the vessel, preferably centered within the vessel along the longitudinal axis of the vessel. As the admixture contacts the hanging fibers the sulfur contaminants are removed from the hydrocarbon. After exiting the side openings the disengagement device defined liquid droplets of upgraded or sweetened hydrocarbon and defined droplets of spent aqueous treatment solution fall into the gravity settling zone where two liquid layers form, one being a lower layer comprising the spent aqueous treatment solution and the upper layer comprising the upgraded hydrocarbon. The aqueous lower layer exits the vessel through the annular space between the outer wall of the shroud and the inner wall of the vessel. The upgraded hydrocarbons are removed as a stream from the top of the upper layer, where it is directed through an opening in the above tray to the entrance of the second stage.

The upgraded hydrocarbon removed from the first stage mixed with a second stream of aqueous treatment solution is then introduced into a second shroud and disengagement device combination where the admixture formed with the hydrocarbon and an aqueous stream, separate from the aqueous stream in the first stage, contacts a second bundle of hanging fibers to remove any remaining mercaptans from the hydrocarbon that were not removed in the lower first stage. This second stage can employ the same type of hanging fibers, the same type of disengagement device, and gravity settling zone as the first stage. The liquids exiting the disengagement device in the second stage are ultimately separated in a second gravity settling zone. A treated hydrocarbon stream having even lower contaminants than the first stage is removed from the top of the vessel and a portion of the spent aqueous treatment is removed from the can be mixed with fresh and/or regenerated aqueous treatment solution and a portion of the resultant admixture can be used as a portion of the aqueous treatment solution introduced and mixed with the sour hydrocarbon feed entering the first stage. Similar steps may be repeated for the third and fourth stages, if needed.

Regardless of the number of stages employed, the contact of the admixture of immiscible liquids with the bundle(s) of hanging fibers causes the fibers to be preferentially wetted by the aqueous liquid to form a thin film on the surface of fibers, and consequently presents a large surface area for mass transfer and contact with the hydrocarbon without substantial dispersion of the aqueous phase in the hydrocarbon. A rapid liquid-liquid mass transfer is enabled by both the large surface area and the functionality of the aqueous solution, which in turn enables the contaminants to be transferred from the hydrocarbon to the thin film of the aqueous treatment solution. As mentioned, two or more stages of contacting with an aqueous treatment solution may be adopted to achieve a greater removal of contaminants.

In those situations where the aqueous treatment solution contains a catalytic component, preferably an oxidation catalyst is used based on a liquid chelated polyvalent metal catalyst solution. Polyvalent catalysts include, but are not limited to, metal phthalocyanines, wherein the metal cation is selected from the group consisting of manganese (Mn), iron (Fe), cobalt (Co), nickel (Ni), copper (Cu), zinc (Zn), ruthenium (Ru), rhodium (Rh), palladium (Pd), silver (Ag) etc. Catalyst concentration is from about 10 to about 10,000 ppm, preferably from about 20 to about 4000 ppm. The particular catalyst selected may be included during preparation of the treatment solution and/or later added to the solution at the place of its use.

The catalytic aqueous treatment solution can also include one or more alcohols that have atmospheric boiling points of from 65° C. to 225° C. These alcohols include, but are not limited to, methanol, ethanol, 1-propanol, 2-propanol, 2-methyl-1 propanol, 2-methyl-2-butanol, cyclohexanol, phenol, cresols, xylenols, hydroquinone, resorcinol, catechol, benzyl alcohol, ethylene glycol, propylene glycol, and other alkyl phenols. When mixed with one or more alkali metal hydroxides, alkali metal salts of the alcohol are formed, preferably in a concentration of from about 5 to about 40 wt %, most preferably from about 10 to about 35 wt %. One type of preferred alcohol is an aromatic alcohol, which are compounds represented by a general formula of aryl-OH. The aryl can be phenyl, thiophenyl, indolyl, tolyl, xylyl, and alike. Preferred aromatic alcohols include phenol, cresols, xylenols, methyl ethyl phenols, ethyl phenols, trimethyl phenols, naphthols, alkylnaphthols, thiophenols, alkylthiophenols, and similar phenolics. Non-aromatic alcohols can be primary, secondary or tertiary alcohols, including methanol, ethanol, n-propanol, iso-propanol, cyclohexanol, 2-methyl-1-propanol, and 2-methyl-2-butanol. A mixture of different alcohols can also be used. The preferred alcohols have an atmospheric boiling point of from about 80° C. to about 215° C. The preferred alkali metal salts of alcohol include, but are not limited to, potassium cyclohexoxide, potassium iso-propoxide, dipotassium propylene glycoxide, potassium cresylates as well as their sodium counterparts, and mixtures thereof.

In a most preferred catalytic treatment solution formulation, one or more carboxylic acids are included. Such acids include, but are not limited to, fatty acids, naphthenic acids, amino acids, keto acids, alpha hydroxy acids, dicarboxylic acids, and tricarboxylic acids. These acids also react with the alkali metal hydroxides to produce their alkali metal salts in concentrations from about 0 to about 40 wt %, preferably from about 5 to about 25 wt %. In general, the carboxylic acids can include alkanoic acids and naphthenic acids, where the alkanoic acids are represented by R—COOH, where R is a hydrogen or an alkyl group ranging from CH3-(i.e. acetic acid) to CH3(CH2)18-(i.e. arachidic acid). Naphthenic acids are a mixture of multiple cyclopentyl and cyclohexyl carboxylic acids with their main fractions preferably having a carbon backbone of 9 to 20 carbons. A mixture of multiple carboxylic acid compounds can also be used as part of the treatment solution.

Regardless of whether a catalyst component is used, the aqueous treatment solution can contain an alkali metal hydroxide selected from lithium hydroxide (LiOH), sodium hydroxide (NaOH), potassium hydroxide (KOH), rubidium hydroxide (RbOH), and cesium hydroxide (CsOH). More than one alkali metal hydroxides can be used. The alkali metal hydroxide is present at a concentration that is more than sufficient to ensure all alcohols and carboxylic acids to form their corresponding alkali metal salts, if present. Sodium hydroxide and especially potassium hydroxide are preferred. In situations where catalytic conversion is not required, the treatment solution would just contain the above-mentioned alkali metal hydroxides as the active ingredient.

Additional treatment solutions include, but are not limited to, acids, bases, amines, ionic liquids, or eutectic solvents. Examples of acids include, but are not limited to, sulfuric acid, hydrochloric acid, or hydrofluoric acid can be used. Bases include, but are not limited to, alkali metal hydroxides selected from lithium hydroxide (LiOH), sodium hydroxide (NaOH), potassium hydroxide (KOH), rubidium hydroxide (RbOH), and cesium hydroxide (CsOH). Sodium hydroxide and especially potassium hydroxide are preferred. Amines include, but not limited to, any commonly used industrial amine, but especially monoethanolamine, diethanolamine, and methyl diethanolamine. Ionic liquids include common liquid electrolytes including, but not limited to, imidazolium based ionic liquids such as 1-butyl-3-methylimidazolium chloride or 1-Butyl-3-methylimidazolium hexafluorophosphate. Deep eutectic solvents include are a special class of ionic liquids formed from a eutectic mixture such as a mixture of a quaternary ammonium salts and a hydrogen bond donor. An example of deep eutectic solvents includes, but is not limited to, a mixture of choline chloride and phenol.

Any number of hydrocarbon feeds with boiling point up to about 350° C. can be treated in our process using our aqueous treatment solution, including, but not limited to, crude oil, kerosene, jet fuel, diesel, light and heavy naphtha. Other feedstocks may include straight run hydrocarbons or cracked or selectively hydrotreated hydrocarbons, LPG, naphtha, crude, crude condensates, and similar materials. Still another possible feedstock that can be used in the process of our invention would include crude oil, ranging from raw crude oil (i.e., untreated and straight out of ground, wellhead oil) to partially or fully treated crudes that have been desalted, dewatered, stripped, or de-odorized and mixtures of these. These so-called "pipeline-ready" crudes or "refinery ready" crude oils at the end of pipeline transportation can be used in our process as the liquid hydrocarbon feed. By the method of our invention, mercaptans in crude oils which have 95 wt % atmospheric equivalent boiling points of up to 600° C. are converted into disulfide oils, prior to fractionation.

Yet another aspect of our invention involves retrofitting an existing unit operation to add one or more of the shroud and disengagement combinations described above into a vessel of the existing unit operation. More specifically, such a retrofitting process could include selecting a vessel that is part of the existing unit operation, where the vessel has a vertical axis, removing one or more structural components from within the vessel, installing a support tray or internal head within the vessel, and installing a shroud and disengagement device combination vertically within the vessel such that the shroud is parallel to the vertical axis of the vessel. A bundle of fibers is also installed within both the shroud and the disengagement device such that the bundle of fibers hangs vertically and parallel to the vertical axis. Preferably, the disengagement device is connected to the top end of the shroud and has a porous support that extends vertically from the top end of the shroud. A closed top of the disengagement device is designed such that all liquids flowing inside the disengagement device must exit the porous support of the disengagement device. The flow path of the exiting liquids following a flow path is tangential to the vertical axis. Once the liquids exit the disengagement device they flow either upward or downward based on the density of the liquid. During installation, the support tray is connected to the shroud such that liquids introduced into the vessel flow vertically upward through the shroud and the disengagement device contacting the fibers. In some cases, it is desirable to retrofit an existing vessel by adding at least two shroud and disengagement device combinations in a vertically stacked configuration such that liquid exiting the disengagement devices of one of the shroud and disengagement device combinations must enter the shroud of the other shroud and disengagement device combination.

Another retrofitting process could include starting with an existing fiber film contacting apparatus that was designed for downward co-current liquid flow through a shroud containing vertical hanging fibers and converting the existing apparatus to a co-current up flow process. Such retrofitting method would include removing the existing shroud and attaching a disengagement device to the top end. A tray or other supporting structure would be added to the lower part of the contacting apparatus. The retrofitted shroud containing the disengagement device would be connected to the tray such that the shroud is parallel to the vertical axis of the contacting apparatus. The existing (or new) bundle of fibers is also installed within both the retrofitted shroud and the disengagement device such that the bundle of fibers hangs vertically and parallel to the vertical axis. As mentioned the disengagement device is connected to the top end of the shroud and has a porous wall that extends vertically from the top end of the shroud. The top of the disengagement device closed such that all liquids flowing inside the disengagement device must exit the porous wall of the disengagement device.

One preferred method to manufacture the shroud and disengagement device combination is to start with a rolled, non-perforated steel sheet or plate. The lower portion of the rolled steel sheet or plate defines the shroud. The upper portion of the rolled steel sheet can be fabricated to make the disengagement device by drilling, punching, or cutting slots to create one or more openings such that the upper portion has at least 50% open area and preferably with enough mechanical strength to support itself as well as the weight of the other portions of the disengagement device and the force of the liquid. In another method, a wire or rod frame could be connected to the top of the shroud thus avoiding the need to drill, cut or punch openings in the rolled steel sheet. In either method, a coalescing material is affixed to the upper portion, or to the wire frame, in any suitable manner, for example, by wrapping the coalescing material in layers around the openings or to the wires. Pleating, blocking or other procedures can be used to attach the coalescing material with the goal of having a uniform density and to leave no holes or gaps where the exiting liquid could channel through without contacting the coalescing material. In the case where openings are drilled, cut, or punched in the upper portion of the rolled steel sheet the coalescing material can be installed either to the inside or the outside of the rolled steel sheet.

These and other embodiments of our invention will become more apparent from the detailed description of the preferred embodiment contained below.

DETAILED DESCRIPTION

A comparison of the instant invention with an apparatus and process known in the art is helpful in understanding the improvements in our invention. Prior known processes employing fiber-film type contactors for contacting two immiscible liquids to effect mass transfer of contaminants from one liquid to another typically involve downward flow of the liquids from the top of a bundle of hanging fibers. There are other types of known processes such as sieve tray countercurrent liquid-liquid extractors but these processes need to operate at relatively low hole velocity and low overall superficial velocity in the tower because at some point the unit becomes limited by dispersed phase flooding or downcomer backup. Even below the flood point there is a velocity at which the carry-over of the heavy (normally aqueous) liquid phase becomes unacceptable. A mesh pad coalescer can be inserted in the top of the tower to mitigate the carryover, however, when installed in a vertical vessel these coalescers have a drop-off of efficiency with increasing velocity. Also the coalescer also takes away from useful tower volume which could be used to effect mass transfer. There is an inherent shortcoming of the prior art devices relating to the fact that liquid-liquid mass transfer depends on interfacial area and interfacial area is enhanced by higher relative velocities between the phases. But to exploit good mass transfer one must inevitably run against some maximum velocity limit where there is an unacceptable carryover.

Contrary to what is known in the art and what one would expect, we have found that having the liquids flow co-currently up flow through a shroud containing hanging fibers at velocities at or above the flooding velocity will achieve close to an equilibrium stage in a relatively small tower length of from about 2 ft. to about 40 ft.

In this instance, an equilibrium stage means a section of the tower where the exiting hydrocarbon stream and aqueous stream are in chemical equilibrium. Flooding velocity is the minimum velocity at which both hydrocarbon phase and aqueous phase will flow upward. Part of the aqueous phase can settle downward, due to gravity force, through the hydrocarbon phase if fluid velocity is not above the flooding velocity. It was determined that this flooding velocity varies from 5 cm/s to 30 cm/s.

In the specific case of liquid-liquid contactors having a continuous lighter phase and a dispersed heavier phase, the flooding point is the velocity at which the gravitational forces causing the settling of the dispersed phase are overcome by the upward drag force on the dispersed phase droplets. This causes the upward flow of the droplets and the regime abruptly changes from countercurrent to co-current upflow.

Figure 1:
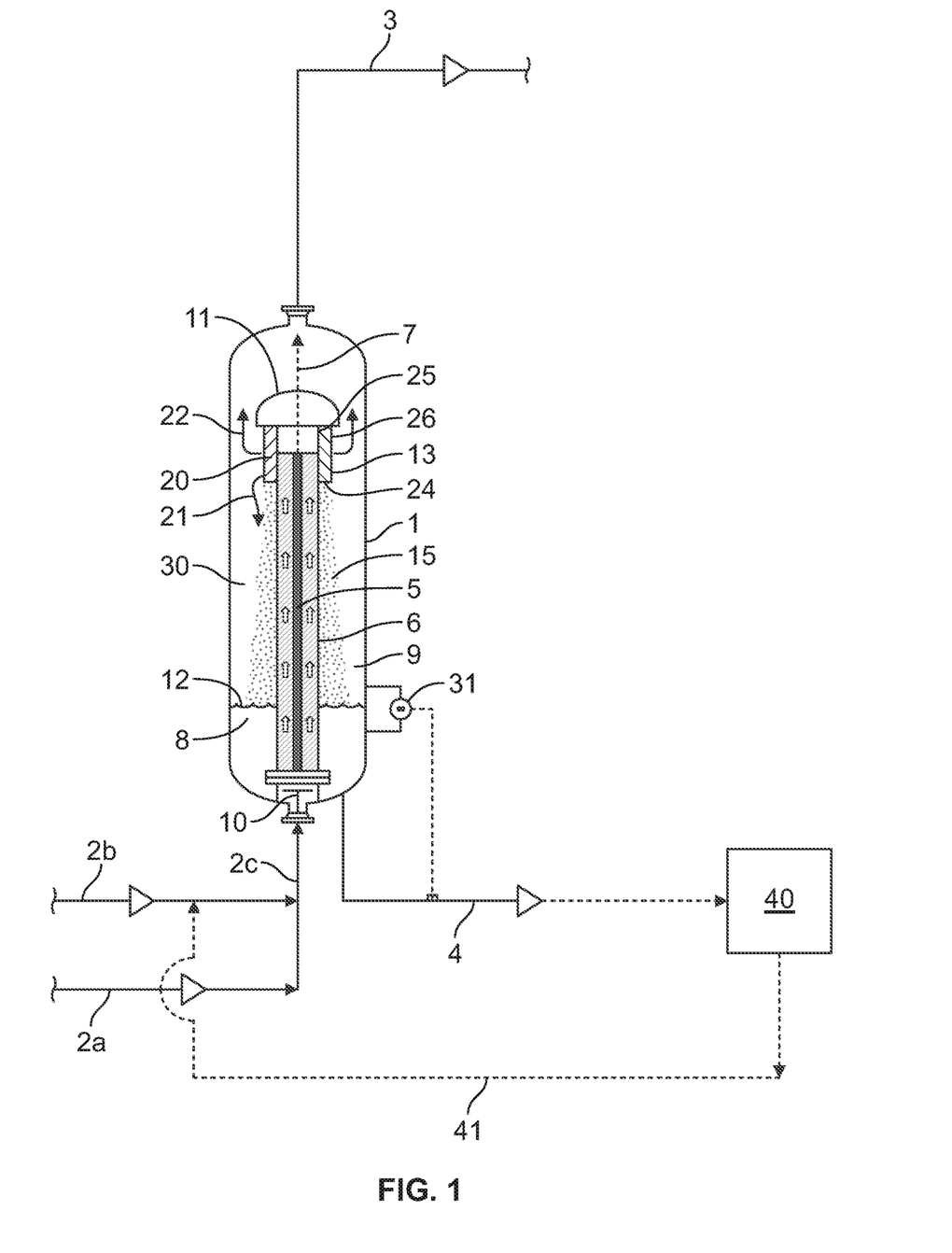
FIG. 1 schematically illustrates a process flow diagram for one possible embodiment of the invention that includes a single stage contacting and separation apparatus.

One possible embodiment of our inventive process is illustrated schematically in FIG. 1 where a first higher density liquid stream 2a is combined with a lower density liquid stream 2b containing contaminants to form an admixture feed 2c that is fed to vessel 1 and through a liquid distributor 10 to cause the admixture to co-currently flow upward into a shroud 6 containing a bundle of vertical hanging fibers 5. As the admixture flows upward in the shroud the admixture contacts a plurality or bundle of hanging fibers 5 that define a vertical axis 7. Notably, vertical vessel 1 does not have a large horizontal section located below the hanging fibers. The hanging fibers 5 are contained within the shroud 6 such that it forces the admixture of liquids to flow parallel to the vertical axis 7 up flow to contact the hanging fibers. Mass transfer of the contaminants from the lower density liquid to the higher density liquid occurs as the admixture travels upward inside the shroud.

As the admixture of liquids moves upward inside the shroud the two liquids begin to separate into distinct phases. However, in those processes where the interfacial tension of the liquids is low (i.e., below about 10 dynes/cm), there is a tendency for dispersion to occur that leads to a poorly defined phase interface between the liquids. In order to counteract this tendency, a disengagement device 13 is used at the top end portion of the shroud. The liquid admixture flows upward out of the top end of the shroud and into the disengagement device 13. A closed cover or cap 11 is located at the top end of the disengagement device and prevents the liquid admixture from exiting the top end of the disengagement device. Instead, the liquid admixture is forced out through the coalescing material 20 that makes up part of the disengagement device 13 following a flow path that is tangential to the vertical axis 7. Once the liquids exit the disengagement device, the lighter density liquid tends to flow upward, as indicated by directional arrow 22, and the denser liquid flows downward, as indicated by directional arrow 21, both flowing into the interior space 30 of the vessel that defines the gravity settling zone. The denser liquid attempts to settle into bottom phase layer 8 and the less dense liquid accumulates in the upper phase layer 9. The interface 12 between the two layers is well defined and allows for level control through controller 31.

Figure 3:
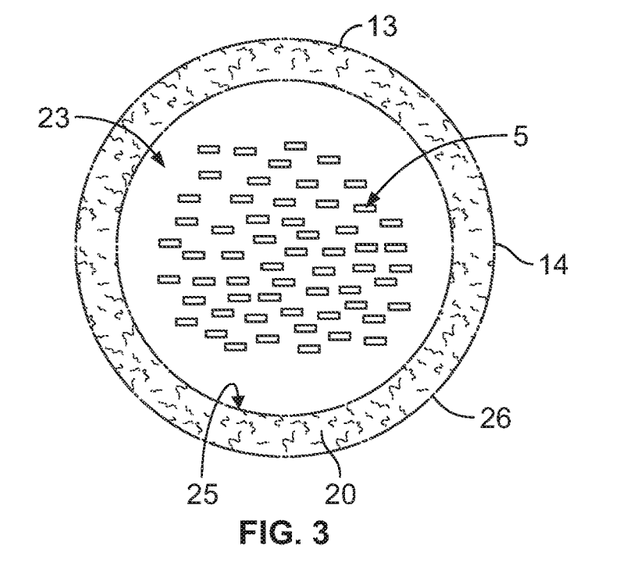
FIG. 3 schematically illustrates a cross-section of a portion of the disengagement device.

A cross-sectional view of the disengagement device 13 is illustrated in FIG. 3 showing the bundle of hanging fibers 5 being contained within an inner wall 25 that forms an interior volume 23. The disengagement device can also have an inner wall 25 and an outer wall 26 that assists in containing the coalescing material 20. Openings 14 allow the liquid admixture to flow into and out of the coalescing material 20.

The lower density liquid in layer 9 flows upwards and is removed via a first outlet or process line 3. The denser liquid in layer 8 flows is removed via a second outlet or process line 4. Controller 31 can monitor and control the vertical position of liquid interface 12 by controlling the flow rate in line 4. In some instances, an optional second coalescing device or coalescing material may be added near the entrance of line 3 or in line 3 to further guard against carryover of the denser liquid. The use of the disengagement device 13 directly addresses the situation where the admixture of liquids in the process is characterized as having low interfacial tension (IFT). Specifically, the disengagement device eliminates the piling up or excessive accumulation of a so-called "dispersion band" (a slow-to-separate mixture of the phases) that can ultimately cause carryover of the heavier phase.

In the particular embodiment shown in FIG. 1, the disengagement device 13 is fixed to and supported on the outside surface of the top portion of the shroud 6, effectively acting as an extension of the shroud. The coalescing material 20 is formed as an annulus. The inner and outer surfaces, 25 and 26, respectively, of the supporting envelope 24 holds the coalescing material in place and provides the inlet and out openings 14 (see FIG. 3) to allow the liquid admixture to flowing into and out of the coalescing material 20, thus allowing radial flow of the admixture of liquids that is not parallel to axis 7. As the liquids in the admixture pass through the coalescing material 20 any dispersion present in the admixture is collapsed to form droplets 15. These droplets 15 continue to grow until they either fall through the coalescing material or re-enter the fiber bundle or exit through the openings in the outer wall of the disengagement device. The growth of the droplets 15 represents the coalescing of one of the liquids in the admixture, typically the more dense liquid. When the droplets are of the denser liquid, they grow and fall, dropping downward to ultimately become part of the liquid in layer 8. Because little or none of the dispersion survives the coalescing surface 20, a distinct phase interface 12 is formed between the higher density liquid in layer 8 and the lower density layer 9. This eliminates carry over of the higher density liquid in overhead line 3 and allows for precise control of interface level 12. It also avoids pump cavitation and contamination which might otherwise be caused by drawing the less dense liquid into process line 4, which removes the denser liquid from the vessel.

As mentioned, the improved contactor/separator of our invention can be used to treat a liquid sour hydrocarbon stream containing mercaptans (e.g., the less dense liquid in stream 2a) where the hydrocarbons are contacted with an aqueous treatment solution (e.g., the denser liquid in stream 2b). The admixture formed by the combination of the sour hydrocarbon with the treatment solution and the contact with the vertical hanging fibers 5 in shroud 6 results in a mass transfer of the mercaptans into the treatment solution. This results in a sweetened hydrocarbon stream being removed from layer 9 as stream 3 and a spent treatment solution being removed from layer 8 via line 4.

Any hydrocarbon can be treated which contains acidic species such as mercaptans. Representative hydrocarbons include straight run or cracked or selectively hydrotreated, one or more of natural gas condensates, liquid petroleum gas (LPG), butanes, butenes, gasoline streams, jet fuels, kerosenes, diesels, naphthas, crude oil and the like. An example hydrocarbon is a cracked naphtha, such as FCC naphtha or coker naphtha, boiling in the range of about 35° C. to about 230° C. Another hydrocarbon is kerosene/jet fuel, which has a typical boiling range of about 150 to about 300° C. Such hydrocarbon streams can typically contain one or more mercaptan compounds, such as methyl mercaptan, ethyl mercaptan, n-propyl mercaptan, isopropyl mercaptan, n-butyl mercaptan, thiophenol and higher molecular weight mercaptans. The mercaptan compound is frequently represented by the symbol RSH, where R is normal or branched alkyl, or aryl. The mercaptan sulfur is present in the hydrocarbons in an amount ranging from about 20 ppm to about 4000 ppm by weight, depending on the liquid hydrocarbon stream to be treated. Specific types of mercaptans, which may be present as straight chain, branched, or both, that may be converted to disulfide material by the oxidation process of this invention will include methyl mercaptan, ethyl mercaptan, propyl mercaptan, butyl mercaptan, pentyl mercaptan, hexyl mercaptan, heptyl mercaptan, octyl mercaptan, nonyl mercaptan, decyl mercaptan, undecyl mercaptan, dodecyl mercaptan, tridecyl mercaptan, tetradecyl mercaptan, pentadecyl mercaptan, hexadecyl mercaptan, heptadecyl mercaptan, octadecyl mercaptan, nonadecyl mercaptan, various mercaptobenzothiazoles, hydroxy mercaptans such as mercaptoethanol, cysteine, aromatic mercaptans such as thiophenol, methyl-substituted thiophenol isomers, ethyl-substituted thiophenol isomers, propyl-substituted thiophenol isomers, etc.

A hydrocarbon to be treated by the process of the instant invention may be a cracked naphtha or distillate which is hydrotreated to remove some undesirable sulfur species and other heteroatoms. An undesirable side effect of hydrotreating is that hydrogen sulfide formed during hydrotreating reacts with thermally-formed olefins to form mercaptans, which are referred to as reversion or recombinant mercaptans to distinguish them from the mercaptans present in the cracked naphtha or distillate conducted to the hydrotreater. Such reversion mercaptans generally have a molecular weight ranging from about 90 to about 160 g/mole, and generally exceed the molecular weight of the mercaptans formed during heavy oil, gas oil, and residue cracking or coking, as these typically range in molecular weight from 48 to about 76 g/mole. The higher molecular weight of the reversion mercaptans and the branched nature of their hydrocarbon component make them more difficult to remove from the naphtha using conventional caustic extraction.

As mentioned, the mass transfer of the sulfur contaminants from the hydrocarbon feed is preferably performed using one of two possible treatment solutions. The first such treatment solution could contain an alkali metal as the active ingredient (a so-called caustic solution) and the second possible treatment solution could contain an additional catalyst component, as discussed above. In either case, a variation of our process could include a further downstream unit operation 40, shown as an optional addition in FIG. 1. This downstream process 40 in the case where the treatment solution contains only alkali metal as the active ingredient, i.e., a caustic treating solution, would involve a regenerative process where the spent caustic treating solution containing mercaptans is contacted with a catalyst formulation in the presence of oxygen to oxidize the mercaptans to disulfide oils (DSO). The disulfide oils are then separated from the caustic and eventually used to blend with other hydrocarbon process streams. All or a portion of the regenerated caustic solution can then be recycled in stream 41 back to mix with stream 2b.

Alternatively, the treatment solution could include both caustic and a liquid form of an oxidation catalyst. In this case, the spent treatment solution removed via line 4 could then be sent to the downstream unit operation 40 where oxygen is added and the mercaptans are oxidized to DSO, which are then separated from the regenerated treatment solution and sent for further processing or blending with other hydrocarbons. A portion or all the regenerated catalytic treatment solution could be recycled as stream 41 and introduced into stream 2b as needed.

Another possible variant of our invention relates to a multiple stage operation. One example of a multi-stage process is the two-stage process schematically illustrated in FIG. 2. Each stage uses a shroud and disengagement device combination as generally described above and shown in FIG. 1. In the two-stage process variation of FIG. 2 includes a second shroud and disengagement combination that is positioned vertically above the first shroud and disengagement combination and is supported by internal head 35. Tray 35 is designed to direct less dense liquid 3a that exited the first disengagement device 13a into the bottom of second shroud 6b containing a second bundle of fibers 5b.

Figure 2:
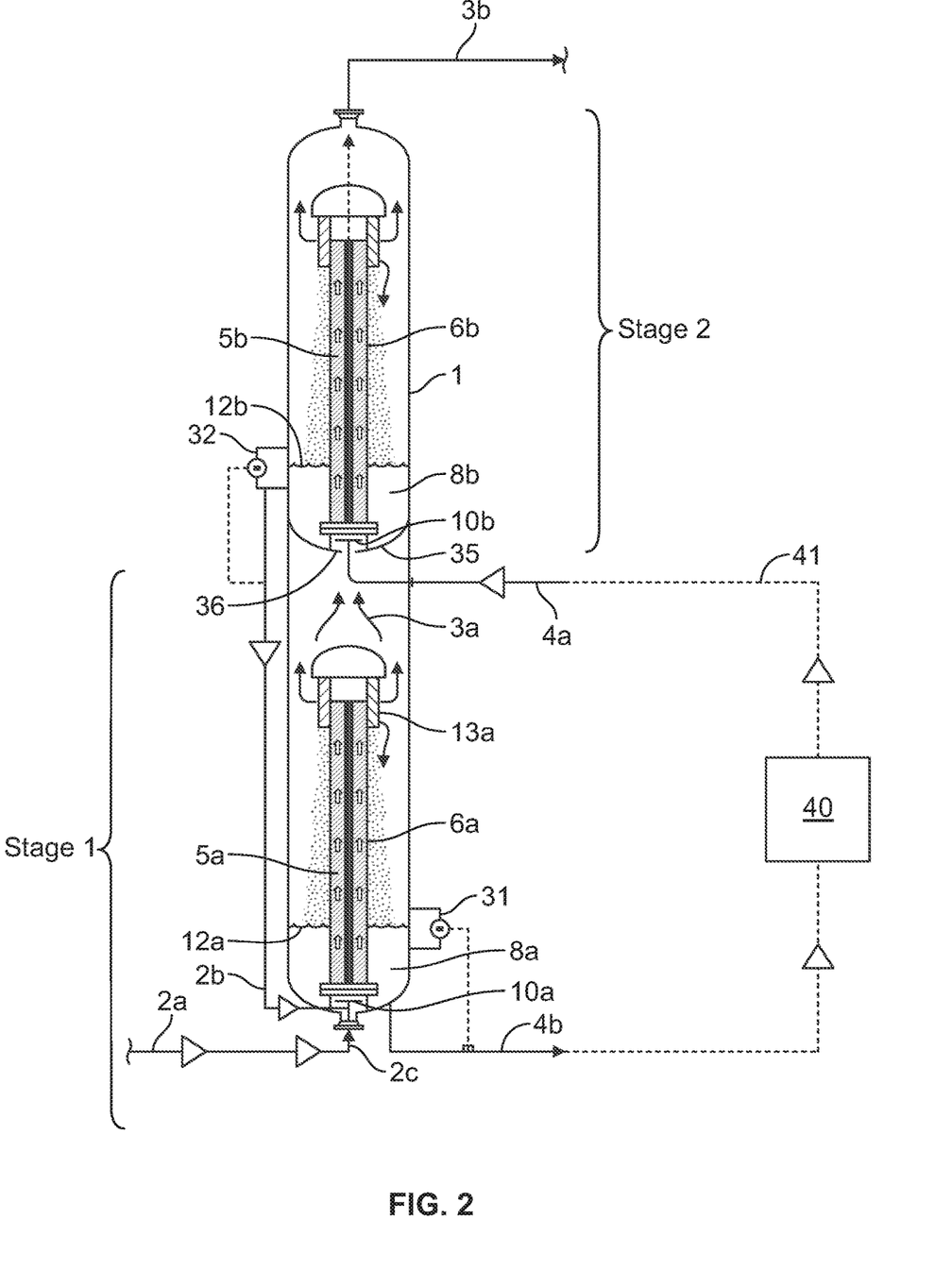
FIG. 2 schematically illustrates a process flow diagram for another possible embodiment of the invention that includes a two-stage contacting and separation apparatus.

Internal head 35 also is configured to direct the more dense liquid introduced in 4a and distributor 10b to combine with less dense liquid 3a to form an admixture that flows upward into shroud 6b where it contacts fibers 5b. In order to force the aqueous phase from 4a to flow upward into the second shroud, instead of allowing it to settle downward into the lower contactor, the velocity of combined stream of 3a and 4a should be above the flooding velocity of approximately 5-30 cm/s, though this varies with the properties of the fluid. More preferably, tray 35 should have an opening 36 with diameter less than that of the shroud, to further increase the fluid velocity while liquid 3a is flowing from lower contactor to the upper contactor. It is preferred that the cross-sectional area of the said opening 36 to be less than 50% of that of the shroud, and resulting in a fluid velocity of 40-120 cm/s at the opening.

Figure 4:
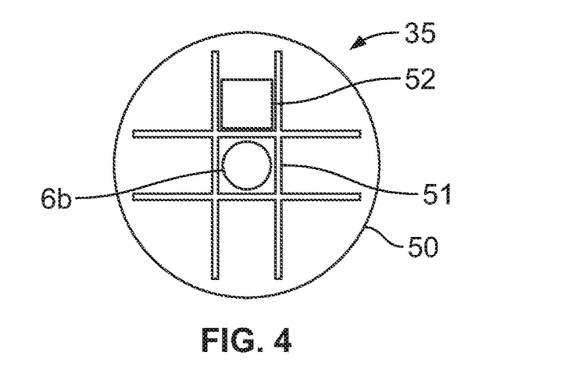
FIG. 4 schematically illustrates a top view of one embodiment of a tray separating two or more stages within the contacting and separation apparatus.
Figure 5:
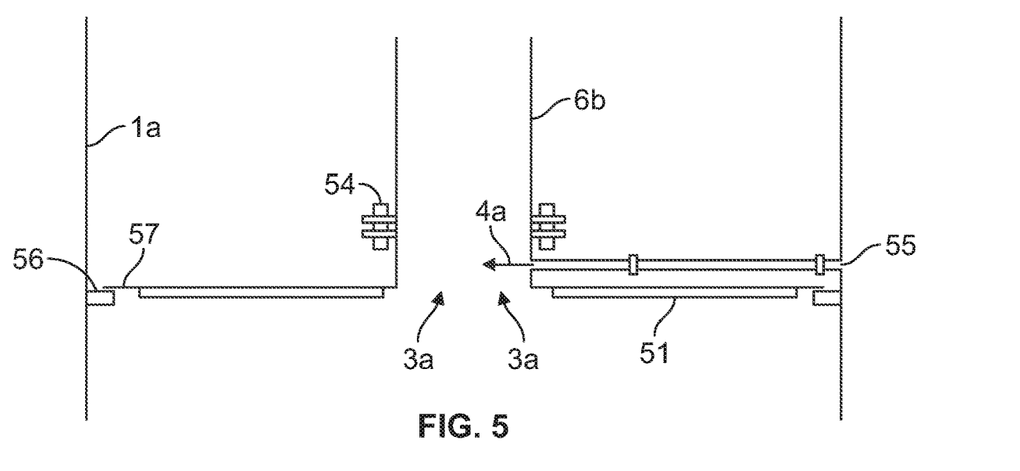
FIG. 5 schematically shows a side view cross-section of the tray illustrated in FIG. 4.

FIGS. 4 and 5 show one possible design of tray 35 and its orientation with respect to the shroud 6b. Support beams 51 hold and support tray deck 50 that be secured to the shroud 6b through a bolted flange 54 and further supported by tray support ring 56 that is secured to the inside wall 1a of vessel 1. An internal manway 52 is preferably included to allow for maintenance during process shutdowns. A liquid treatment inlet line 55 for introducing liquid treatment solution is shown in fluid communication with less dense liquid 3a moving upward from the first stage and entering shroud 6b in the second stage.

As evident from FIG. 2, less dense liquid 3a has already undergone a first mass transfer process within shroud 6a as part of the first stage of operation. The second stage mass transfer operation that occurs in shroud 6 removes contaminants that were not removed during the first stage of operation. The separated denser liquid in layer 8b is removed via stream 2b and fed to the bottom of stage 1 through distributor 10a such that a liquid admixture is made with the less dense feed entering the vessel via 2a. This admixture is directed up flow into shroud 6a containing fibers 5a. A liquid level controller 32 is used to control the level of interface 12b in the second stage gravity settling zone through control of the removal rate of the denser liquid from layer 8b. The less dense liquid above interface 12b exits the vessel through process line 3b.

The denser liquid accumulating in layer 8a of the first stage gravity settling zone is removed via line 4b. The amount of the denser liquid removed is controlled by controller 31 which also monitors and controls the level of interface 12a. As similarly described above for the single stage process, an optional unit operation 40 can be included be included as a downstream process. Likewise, as discussed above the denser liquid treatment solution could be one of the two types previously mentioned and the regenerated treatment solution in stream 41 could be introduced into the process through stream 4a and/or added to stream 2b.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A co-current flow process for treating a hydrocarbon with a treating solution, comprising, in combination,
   a) feeding a hydrocarbon contaminated with sulfur compounds and an aqueous treating solution to a bottom end of a shroud supported vertically within an interior of a vessel, where the shroud comprises a length defined by a non-porous wall extending from the bottom end to a top end, where a bundle of fibers hangs vertically within the shroud to define a vertical axis, where the hydrocarbon and treating solution form a liquid admixture that contacts the fibers as the liquid admixture flows upward through the shroud parallel to the vertical axis;
   b) allowing the liquid admixture to flow the length of the shroud until the liquid admixture enters a bottom section of a disengagement device comprising coalescing material, where the disengagement device is connected to the top end of the shroud surrounding the fibers and extending vertically from the top end of the shroud terminating at a closed cap that forces all the liquid admixture to exit through the coalescing material following a flow path that is tangential to vertical axis;

c) controlling the flow of the liquid admixture through the shroud to effect mass transfer of the sulfur contaminants into the aqueous treating solution to form a spent aqueous treatment solution;

d) coalescing the spent aqueous treating solution as it passes through the disengagement device; and e) collecting the spent aqueous treating solution in a bottom section of the interior of the vessel; and f) removing a treated hydrocarbon stream from a top section of the interior of the vessel.

2. The process of claim 1 where the control of the flow of liquid admixture comprises operating the process at or above flooding velocity.

3. The process of claim 1 where the feeding of the hydrocarbon contaminated with sulfur compounds and the aqueous treating solution are supplied through a tray that supports the shroud and directs the liquid admixture into the bottom end of the shroud.

4. The process of claim 1 further comprising continuously removing a portion of the spent treating solution from the column, regenerating the spent treating solution to form a make-up treating solution and returning a portion of the make-up treating solution to the vessel.

5. The process of claim 1 where the sulfur compounds comprise mercaptans and the aqueous treating solution further comprises an aqueous catalyst solution.

* * * * *